United States Patent Office.

CHARLES THOMAS KINGZETT, OF TREVENA, AMHURST PARK, COUNTY OF MIDDLESEX, ENGLAND.

ANTISEPTIC SOLUTION.

SPECIFICATION forming part of Letters Patent No. 374,125, dated November 29, 1887.

Application filed September 5, 1887. Serial No. 248,867. (No specimens.)

*To all whom it may concern:*

Be it known that I, CHARLES THOMAS KINGZETT, F. I. C., F. C. S., vice-president Society of Public Analysis, a subject of the Queen of Great Britain, residing at Trevena, Amhurst Park, in the county of Middlesex, England, have invented an Improved Solution for use as an Antiseptic, Disinfectant, Deodorant, Oxidant, and generally as a Sanitary Reagent, of which the following is a specification.

My invention consists in making a combination of peroxide of hydrogen (a substance which exhibits very powerful effects as an oxidizing reagent) with the perchloride of mercury, otherwise known as "corrosive sublimate," (a substance which recent investigations have proved to be remarkably efficacious as an antiseptic and germicide,) in the form of a solution which keeps permanently free from precipitation. The combination is new in itself, however. To effect this object I dissolve as much perchloride of mercury as is required, together with an equal weight of common salt, otherwise known as "chloride of sodium," in a solution of peroxide of hydrogen. I employ salt in this mixture in order to avoid the precipitation which takes place on standing in solution of pure perchloride of mercury.

The mixture of salt and perchloride of mercury is well known.

My invention relates to the combination, with the salt and perchloride of mercury, of peroxide of hydrogen. As for the peroxide of hydrogen, its strength may be as desired. When a dilute solution is employed, the perchloride of mercury and common salt may be dissolved directly in the solution, using gentle heat, if desired, to facilitate the process. When, however, it is desired to use a strong solution of peroxide of hydrogen, (say of five, ten, or twenty volume strength,) it is best to dissolve the perchloride of mercury and common salt in water, and then to add in the desired proportion the resulting solution to that of the peroxide of hydrogen. In this way decomposition of the peroxide of hydrogen by the influence of heat is avoided.

As already mentioned, peroxide of hydrogen may be used of any desired strength, and its strength is generally expressed by chemists in volumes of oxygen which the solution is capable of yielding when decomposed into water and oxygen, thus: $H_2O_2 = H_2O + O$. A solution which yields upon such said decomposition its own or an equal volume of oxygen gas is said to be of one-volume strength, and so on.

For my purpose the peroxide of hydrogen may be prepared by any known process—for example, by the action of acids upon peroxide of barium, as is well understood by chemists, or by the oxidation of turpentine in the presence of water by means of a current of air or oxygen.

I have experimentally ascertained that peroxide of hydrogen, as obtained by the process last mentioned, is quite suitable for use in my present invention.

I give the following as further descriptive of the process of preparing my new combination of substances of such a strength (in this case) that the product shall contain five per cent., by weight, in volume of perchloride of mercury and be of about two volumes in strength in terms of peroxide of hydrogen. Take fifty grams of perchloride of mercury and fifty grams of common salt and dissolve by the aid of gentle heat in seven hundred and fifty cubic centimeters of water. Then add to this mixture when cooled about two hundred cubic centimeters of a ten-volume solution of peroxide of hydrogen. Operating in this way on one occasion, I prepared a mixture which was tested daily for peroxide of hydrogen during two months, and it was ascertained that the rate of spontaneous decomposition of peroxide of hydrogen was less than that which took place in a pure solution of peroxide of hydrogen (that is to say, without perchloride of mercury and common salt) during the same period.

My new mixture may be prepared so as to contain any desired percentage of perchloride of mercury (within its limits of solubility in the solution) and any desired amount of peroxide of hydrogen; but I have found that typically useful mixtures are those containing, respectively, two and five per cent. of mercuric chloride and of two and five volume strength in terms of peroxide of hydrogen.

Such mixtures are new and present many advantages to surgeons for use in antiseptic surgery, and to sanitary officers and the general public for use as ordinary disinfectants, by reason of the fact that they destroy all kinds of disease germs on the one hand, and on the other hand they are capable of oxidizing the toxic products of diseased and putrefactive processes.

What I claim, and desire to secure by Letters Patent of the United States, is—

The herein-described composition of matter to be used as an antiseptic, disinfectant, deodorant, oxidant, or generally as a sanitary agent, consisting of a solution containing peroxide of hydrogen, perchloride of mercury, and common salt.

CHARLES THOMAS KINGZETT.

Witnesses:
JNO. H. WHITEHEAD,
24 *Southampton Buildings, London, W. C.*
WALTER J. SKERTEN,
17 *Gracechurch Street, London, E. C.*